(12) United States Patent
Steuer et al.

(10) Patent No.: US 8,127,640 B2
(45) Date of Patent: Mar. 6, 2012

(54) DETACHABLE COUPLING

(75) Inventors: Werner Steuer, Schweinfurt (DE);
Peter Kainzner, Schweinfurt (DE);
Gunter Pehse, Niederwerrn (DE)

(73) Assignee: SRAM Deutschland GmbH, Schweinfurt (DE)

( * ) Notice: Subject to any disclaimer, the term of this patent is extended or adjusted under 35 U.S.C. 154(b) by 1063 days.

(21) Appl. No.: 10/637,961

(22) Filed: Aug. 8, 2003

(65) Prior Publication Data
US 2004/0079185 A1 Apr. 29, 2004

(30) Foreign Application Priority Data

Aug. 8, 2002 (DE) .................................. 102 36 276
Jul. 23, 2003 (DE) .................................. 103 33 360

(51) Int. Cl.
*F16C 1/10* (2006.01)
*F16C 1/22* (2006.01)
*F16C 1/26* (2006.01)

(52) U.S. Cl. ....................................... 74/502.6; 74/502.4
(58) Field of Classification Search ................. 74/502.4, 74/502.6, 501.5 R, 500.5; *F16C 1/10*
See application file for complete search history.

(56) References Cited

U.S. PATENT DOCUMENTS

| | | | |
|---|---|---|---|
| 2,222,613 A * | 11/1940 | Green .............................. | 464/53 |
| 2,296,993 A * | 9/1942 | Gerry .............................. | 74/503 |
| 2,416,206 A | 2/1947 | Norton | |
| 2,890,066 A | 6/1959 | Kerr | |
| 3,020,778 A | 2/1962 | Davidson | |
| 4,218,935 A | 8/1980 | Ion | |
| 4,887,929 A | 12/1989 | Hale | |
| 5,039,138 A | 8/1991 | Dickirson | |
| 5,575,180 A | 11/1996 | Simon | |
| 6,324,938 B1 * | 12/2001 | Okouchi ...................... | 74/502.6 |
| 6,349,614 B1 | 2/2002 | Matsuo | |
| 6,840,129 B2 * | 1/2005 | Itou .............................. | 74/502.4 |
| 7,540,217 B2 * | 6/2009 | Ueno .......................... | 74/502.6 |

FOREIGN PATENT DOCUMENTS

| | | |
|---|---|---|
| DE | 719 512 | 4/1942 |
| DE | 89 10 999 | 11/1989 |
| DE | 40 07 954 | 9/1991 |
| EP | 0 105 176 B1 | 4/1988 |
| EP | 0 661 204 B1 | 8/1997 |
| EP | 0 805 104 B1 | 4/2003 |
| FR | 780 002 | 4/1935 |
| WO | WO 00/17040 | * 3/2000 |

OTHER PUBLICATIONS

Merriam Webster's Collegiate Dictionary, Tenth Edition, 1996, p. 975.*
Webster's II New Riverside University Dictionary, 1994, pp. 723 and 724.*

* cited by examiner

*Primary Examiner* — Vinh T. Luong
(74) *Attorney, Agent, or Firm* — Milan Milosevic; Lisa Serdynski; Steven Courtright

(57) ABSTRACT

A detachable coupling for connecting a pull cable connected to a shift actuator to a shifting cable connected to an internal gear hub for transmitting a shifting movement of the shift actuator to the internal gear hub. The detachable coupling includes an internal gear hub casing having a cable guide extending therefrom and a connecting sleeve having a contoured slot configured to be removably attachable to the cable guide. An end of the shifting cable is configured to be removably coupled to an end of the pull cable for transmitting the shifting movement along a cable transmission path.

20 Claims, 6 Drawing Sheets

DETACHABLE COUPLING

BACKGROUND OF THE INVENTION

The present invention relates to detachable coupling for bicycle transmissions and, more particularly, to an easily detachable coupling for connecting a pull cable to an internal gear hub.

A detachable coupling allows the cable pull to be connected or disconnected from the gear hub before connecting or disconnecting the driving wheel. A detachable coupling is disclosed in European Patent Application EP 0805104A2 that includes a casing for housing a control cable that is connected to a rear wheel multispeed hub having a driving wheel. The driving wheel is positioned, coaxially to the hub axle, at one of the ends of the hub. The cable spool converts the linear movement of the control cable into a rotating movement. The casing includes a drive casing for covering the driving wheel and a casing extension for accommodating the control cable and the cable. A joint having a cable guide connects the drive casing to the casing extension. The casing extension is tubular and has an opening covered by a hinged lid and a fastening element to attached it to the bicycle frame. A spring element and a coupling is accommodated in the casing extension. The operating pull is connected to one end of the spring element by a clamp and the cable is connected to the other end of the spring element. A cable casing supports itself on an adjusting screw connected to the casing extension.

To disconnect the connecting device, the shifting position is set to position resulting in the least amount of cable pull tension. The hinged lid on the casing extension is swung open and spring element and the coupling are removed from the casing extension and then separated from one another. The spring element remains on the casing extension, and consequently on the driving wheel, while the cable casing with the adjusting screw and the cable with the coupling piece remain on the bicycle frame.

Another connecting device is disclosed in U.S. Pat. No. 6,349,614. Here, the casing adjacent the hub leads into a tube extension to guide the shifter cable and to house one end of the cable casing. The other end of the cable casing is accommodated by a clamping device, which provides the necessary installation space for the connecting device of the shifting and pull cables and supports the cable casing of the pull cable connected to the shift actuator.

The connection between the shifting cable and the pull cable is a detachable screw or bayonet connection. The corresponding parts of the bayonet connection are connected to the ends of the shifting or pull cable. To detach the connecting device, the shift adjustment is set to the least pull cable tension and the screw or the bayonet connection is opened by twisting the corresponding components. Locking parts are located within an open holding device, resulting in the locking parts being unprotected. Since the locking parts are unprotected, it is necessary to seal the cables during the shifting process and the locking parts. The cable pull with the appropriate locking part and the cable casing may be removed from the slotted receptacle in the holding device. When the driving wheel is detached, the casing remains with the shifter cable and the cable casing with the holding device on the wheel, while the cable pull remains with its cable casing on the bicycle frame.

The problem with the above devices is that in order to connect or disconnect the pull cable from the shifting cable, the cable connection must either be removed with difficulty from the casing extension or twisted against each other in the holding device. The connecting device with the casing extension requires relatively a lot of installation space and is difficult to handle if a wheel needs to be changed since the hinged lid must be opened and the cable connection removed and unhooked for releasing. The connecting device with the open holding device is very dirt-prone since it is right next to the chain, and despite the open holding device, the twisting of the bayonet connection is prevented. Even there, the handling of the detached wheel is impaired by the shifter cable or shifter cable casing that remains sticking out on the hub.

SUMMARY OF THE INVENTION

An object of the present invention is to provide a detachable connecting device between the pull cable and an internal gear hub that fits in between dropouts of the fork.

Another object of the present invention is to provide a detachable coupling between that cable pull and an internal gear hub that is easily separable with one hand when changing the wheel.

A further object of the present invention is to provide a detachable connecting device that is small and does not protrude beyond the driving wheel.

A still further object of the present invention is to provide a correction of the transmission paths setting that is simple and possible in an easily accessible position. The joining elements are protected from dirt accumulation and the elements.

The present invention provides a detachable coupling for connecting a pull cable connected to a shift actuator to a shifting cable connected to an internal gear hub for transmitting a shifting movement of the shift actuator to the internal gear hub. The detachable coupling includes an internal gear hub casing having a cable guide extending therefrom and a connecting sleeve having a contoured slot configured to be removably attached to the guide. An end of the shifting cable is configured to be removably coupled to an end of the pull cable for transmitting the shifting movement along a cable transmission path. The connecting sleeve has first and second ends. The contoured slot is located at the first end of the sleeve and the second end has a thread for receiving an adjusting element for adjusting the length of the cable transmission path. The contoured slot extends in a radial direction. The cable guide may include a protruding contour configured to engage the contoured slot of the connecting sleeve to form an axially rigid connection.

The pull cable and the shifting cable have nipples at one end. The pull cable nipple extends axially through the connecting sleeve and is biased by a spring element against a stopping face located in the connecting sleeve. The pull cable nipple includes a contoured groove for receiving the nipple of the shifting cable. The connecting sleeve has an inner contour having an non-circular shape to prevent the twisting of the pull cable nipple inside the connecting sleeve, ensuring that the contoured groove of the pull cable nipple is aligned with the contoured slot of the connecting sleeve to receive the shifting cable nipple. The connecting sleeve may include a window for viewing the position of the pull cable along the connecting sleeve.

The shifting cable nipple is biased by a spring element against a stopping face in the cable guide. The shifting cable nipple has first and second radially extending contours. The first radially extending contour is received in a cavity on the cable guide such that the second radially extending contour protrudes beyond an end of the cable guide and is received in the contoured groove of the pull cable nipple.

The casing is axially pinned to the hub via the axle and has a cable spool for converting the linear shifting cable movement into a rotating motion which then is fed into the internal gear hub. The casing window for viewing the alignment of a casing marking with a cable spool marking. The cable guide has a certain contour that provides a rigid axial connection but allows movement in a lateral direction between the casing and the connecting sleeve.

The connecting device may further include a sliding sleeve for covering the contoured slot of the connecting sleeve. The sliding sleeve protects the nipples against dirt accumulation and may have elastic seals. The sliding sleeve is axially fixed in a closed position on the connecting sleeve by an elastic snap-in locking device. In another embodiment, the sliding sleeve may be biased toward the closed position by an elastic force.

To simplify the adjustment of the positions of the shifting cable and the pull cable, windows are provided on the casing and the connecting sleeve to detect markings on the cable spool and pull cable. The shifting cable is adjusted by screwing the cable guide in or out of the casing until the position of the marking on the cable spool aligns with a marking on the window on the casing. The pull cable is adjusted by rotating the adjusting element relative to the connecting sleeve until the marking on the pull cable nipple appears in the window on the connecting sleeve.

In another embodiment of the present invention, the connection between the guide and the connecting sleeve may be a bayonet connection. After the bayonet connection is released, the shifting cable and the cable pull are disconnected by moving them radially. The shifting cable nipple has a protruding contour and the cable pull nipple has a contoured slot.

The present connecting device is not limited to bicycle applications but may, in a modified version, be used anywhere where a defined, constant length of cable is needed that is made up of two easily-detachable components.

These and other features and advantages of the invention will be more fully understood from the following description of certain embodiments of the invention, taken together with the accompanying drawings.

DETAILED DESCRIPTION

Figure 1:
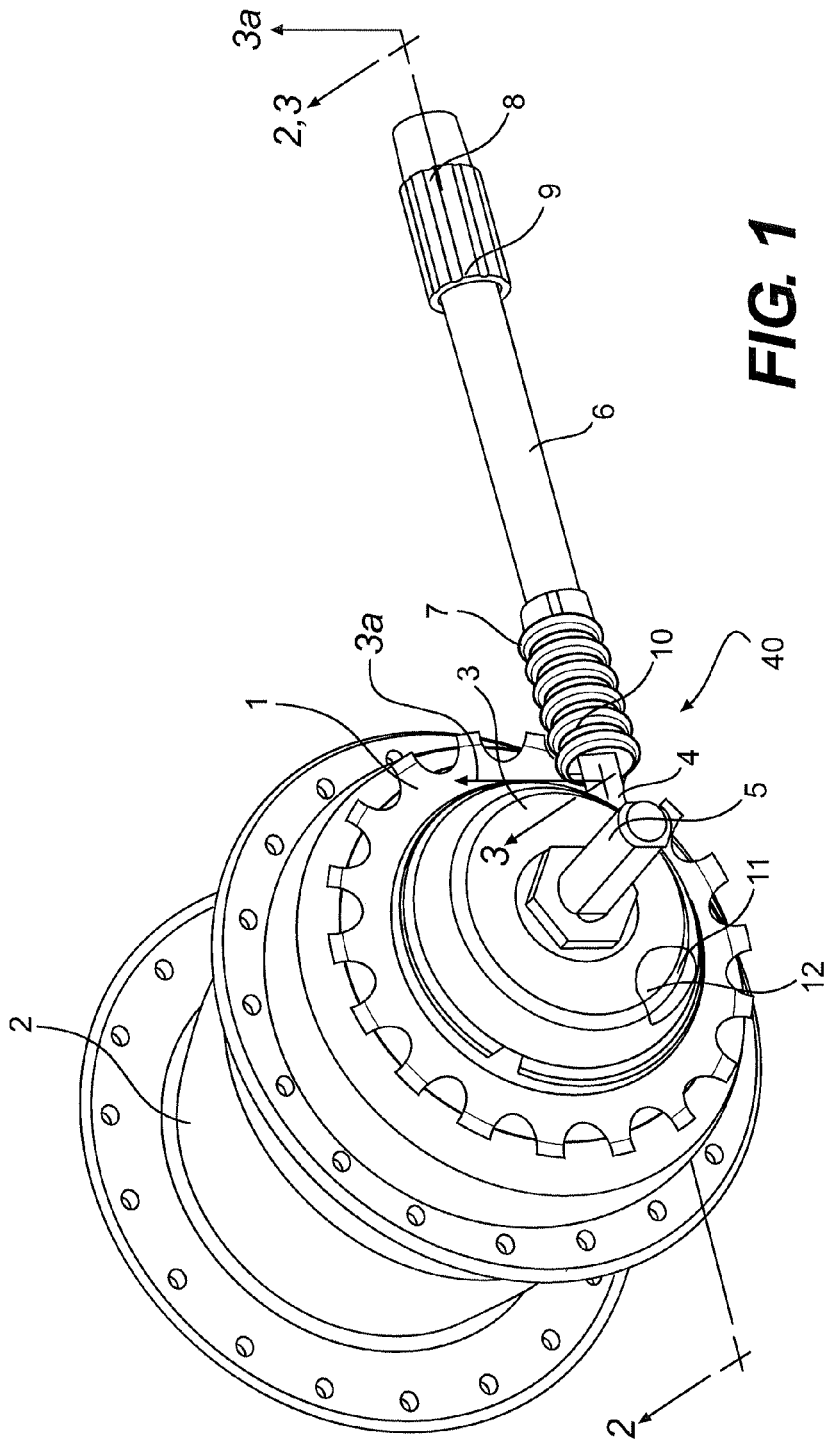
FIG. 1 is a perspective view of a connecting device in accordance with one embodiment of the present invention.

FIGS. 1-4 illustrate a detachable connecting device, for example a detachable coupling 40 for connecting a pull cable 13 connected to a shifter actuator (not shown) to a shifting cable 16 connected to an internal gear hub 2 in accordance with one embodiment of the present invention. The detachable coupling 40 generally includes a casing 3 mounted on a driving wheel 1 of the internal gear hub 3 and a connecting sleeve 6. The casing 3 includes a cable guide 4 extending therefrom. The connecting sleeve 6 has a contoured slot 21 at one end for receiving the cable guide 4.

Figure 2:
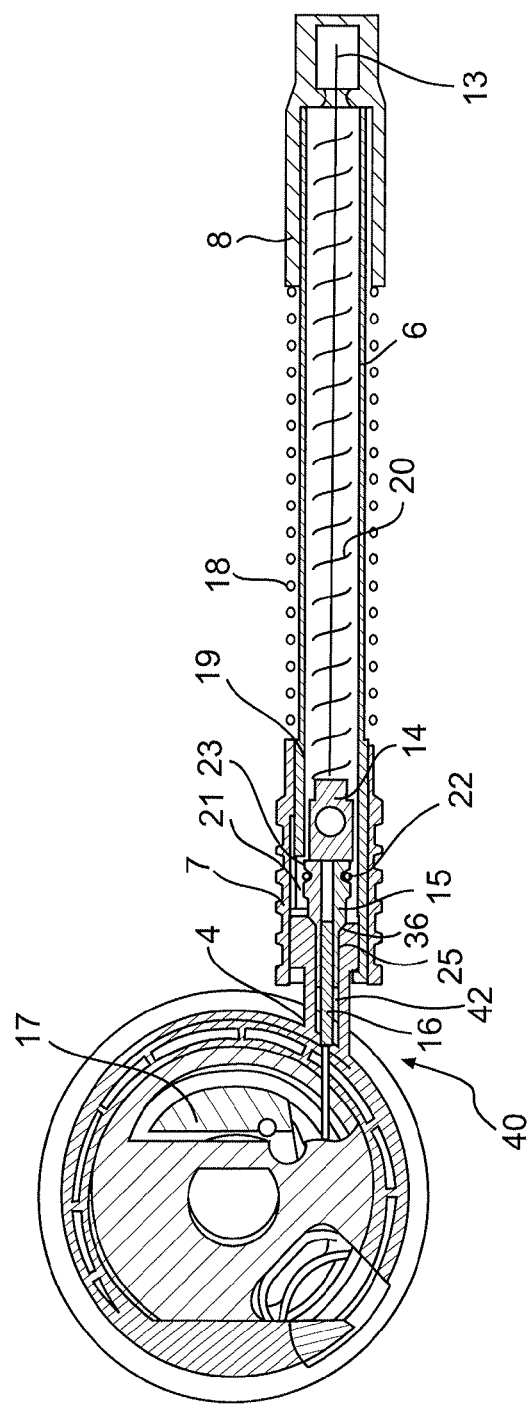
FIG. 2 is a cross-sectional view of the connecting device of FIG. 1 taken generally about line 2-2 of FIG. 1.

Referring to FIG. 2, a linear shifting movement is transmitted by a pull cable 13 that extends through the connecting sleeve 6 to a shifting cable 16 that extends through the cable guide 4 and is connected to a cable spool 17. The cable spool 17 is covered by the casing 3. The cable spool 17 converts the linear shifting movement into a rotating shifting movement, which is then fed into the internal gear hub 2. At one end of the connecting sleeve 6 is a thread 27 for receiving an adjusting element 8 that may be rotated relative to the connecting sleeve 6 to adjust the tension in the pull cable 13. At the other end of the connecting sleeve 6 is a sliding sleeve 7 that is biased to cover the contoured slot 21 by a coil spring 18 and is held in that position by being snapped into a slot 19 or by being pushed against a stop collar 29, see FIG. 3, by a spring. The adjusting element 8 includes a twisting profile 9 and the sliding member 7 includes a shifting profile 10. The contoured slot 21 has a cylindrical insertion contour 28. The cable guide 4 has a protruding contour 30 configured to engage the contour 28 to form an axially rigid connection but permits lateral movement without causing a change in the length of the cable path transmission.

Figure 3:
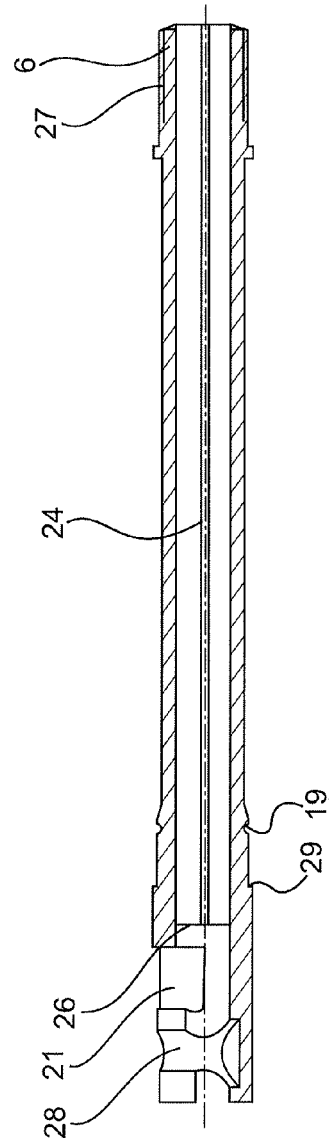
FIG. 3 is a cross-sectional view of a connecting sleeve of the connecting device taken generally about line 3-3 of FIG. 1.
Figure 3A:
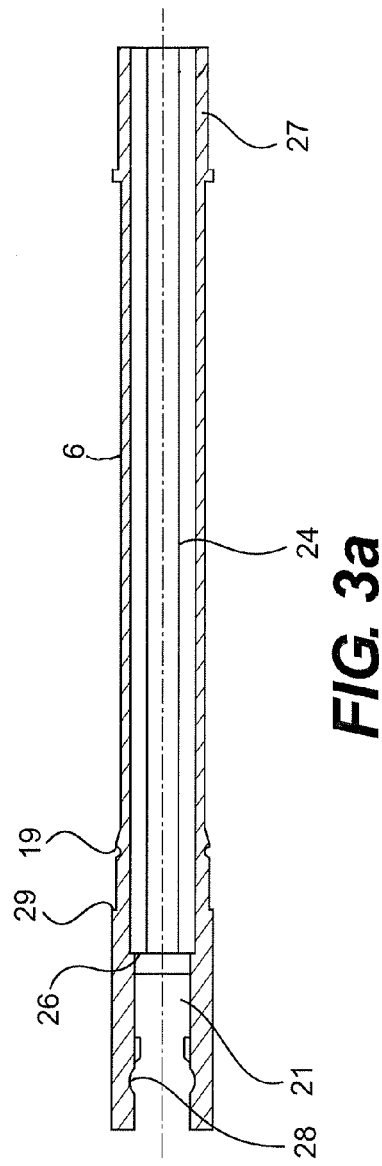
FIG. 3a is a cross-sectional view of the connecting sleeve taken generally about line 3a-3a of FIG. 1, similar to FIG. 3 but rotated 90 degrees.
Figure 4:
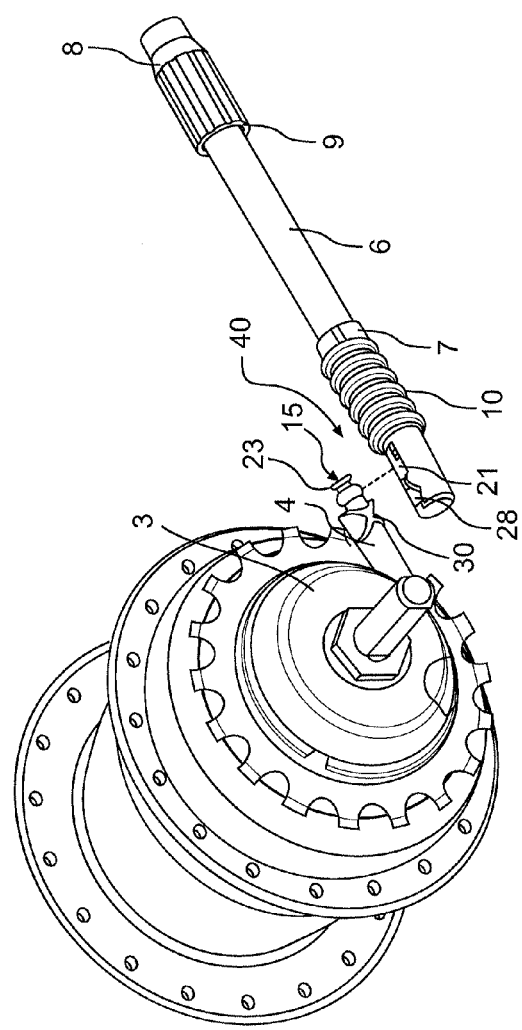
FIG. 4 is a perspective view of the connecting device of FIG. 1 showing the connecting device disconnected from the internal gear hub.

Referring to FIGS. 2, 3 and 3a, the pull cable 13 has a nipple 14 at one end that axially extends through the connecting sleeve 6 and is biased against a stopping face 26 by a spring element such as a compression spring 20. The connecting sleeve 6 has an inner contour 24 having a non-circular shape, preferably a hexagon shape, preventing the pull cable nipple 14 from twisting in the connecting sleeve 6 to ensure that the pull cable nipple 14 and the contoured slot 21 of the connecting sleeve 6 are aligned to allow the pull cable 13 and the shifting cable 16 to be coupled together. The pull cable nipple 14 includes a contoured groove 22 for receiving an end of the shifting cable 16. The shifting cable 16 has a nipple 15 at the end received in the contoured groove 22 of the pull cable nipple 14. The shifting cable nipple 15 has first and second radially extending contours 25 and 23, respectively. The first radially extending contour 25 is received in a cavity 42 of the cable guide 4 such that the second radially extending contour 23 protrudes beyond the end of the cable guide 4 and is received in the contoured groove 22. The second radially extending contour 23 and the contoured groove 22 of the pull cable nipple 14 is configured such that when the shifting cable nipple 14 is received in the contoured groove 22 of the pull cable nipple 14 there is substantially no clearance between the nipples 14, 15. The shifting cable nipple 15 is biased against a stopping face 36 in the cable guide 4 by tension in the cable spool 17 caused by a spring element (not shown) in the internal gear hub 2.

Figure 5:
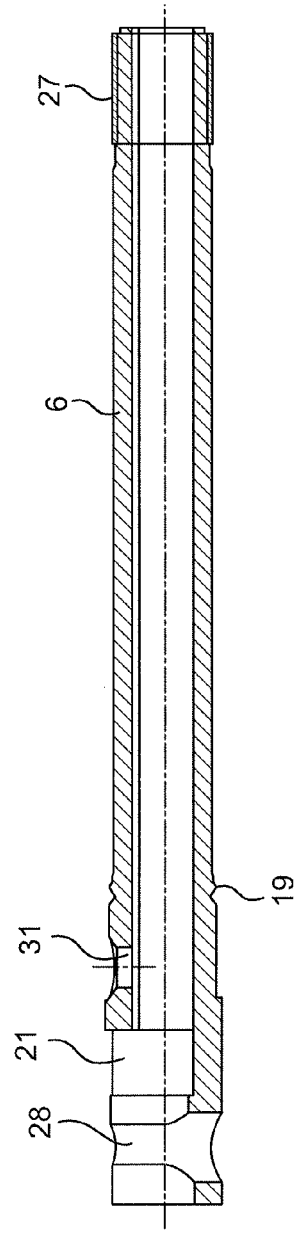
FIG. 5 is a cross-sectional view of a connecting sleeve in accordance with another embodiment of the present invention.
Figure 5A:
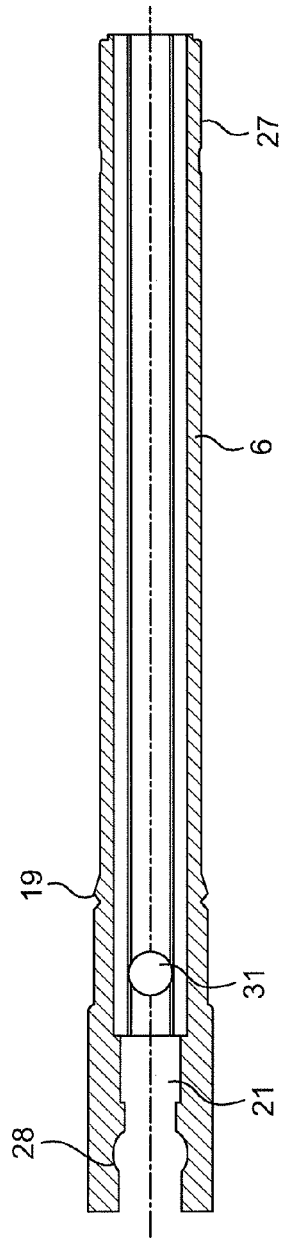
FIG. 5a is a cross-sectional of the connecting sleeve of FIG. 5 that is rotated 90 degrees.

FIGS. 5 and 5a illustrates another embodiment of the connecting sleeve 6, similar to the connecting sleeve of FIGS. 1-4, except that the connecting sleeve 6 includes a window 31 for viewing the position of the pull cable nipple 14 within the connecting sleeve 6. To move the pull cable 13 into the desired position the adjusting element 8 is rotated until a marking 32 (see FIG. 6) on the pull cable 13 appears in the window 31. Looking to FIG. 6, the cable guide 4 may include an adjustment thread 33 that receives the casing 3. The cable guide 4 may be rotated relative to the casing 3 to align a cable spool marking 34 with a casing marking 35 that may be viewed through a window 12 in the casing 3.

Figure 6:
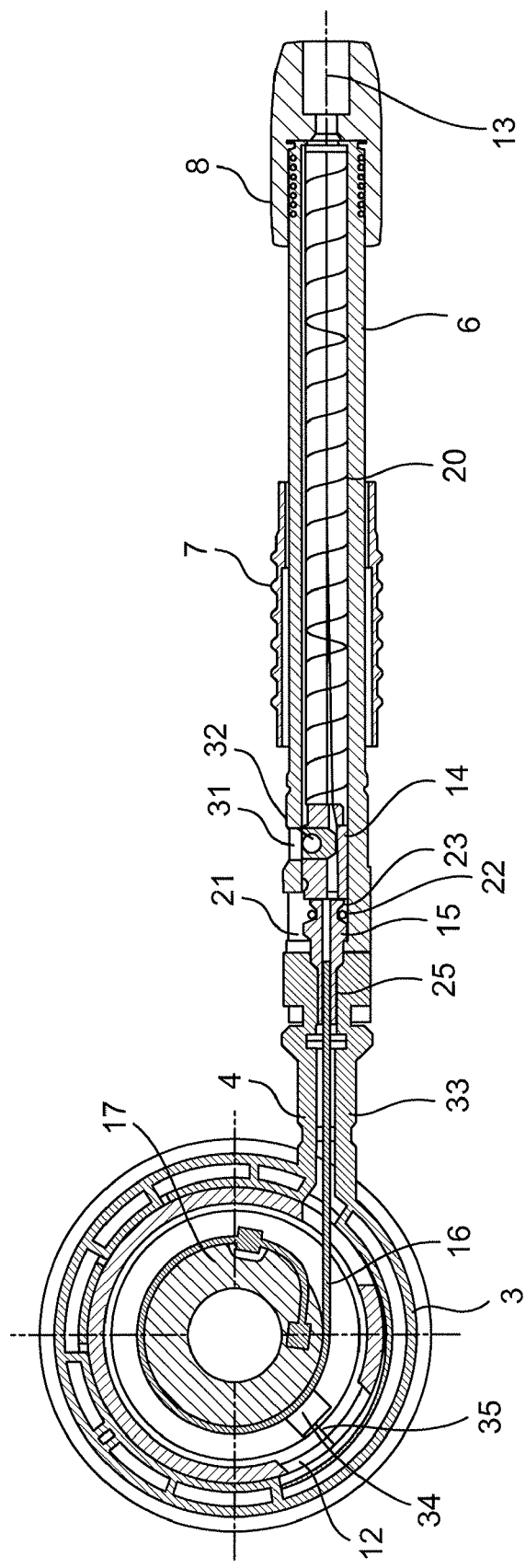
FIG. 6 is a cross-sectional view of a connecting device in accordance with another embodiment of the present invention.

To detach the cable guide 4 from the connecting device 6, the shifting speed with the least amount of tension in the pull cable 13 is engaged. Then the sliding sleeve 7 is slid along the connecting sleeve 6 until the contoured slot 21 is uncovered as shown in FIG. 6. Since the pull cable nipple 14 is biased against the stopping face 26 in the connecting sleeve 6 by spring element 20 and the shifting cable nipple 15 is biased against the stopping face in the cable guide 4 by a spring force, the connecting sleeve 6 is then pushed in the radial direction relative to the cable guide 4, resulting in the connecting sleeve 6 detaching from the cable guide 4. After disconnection of the cables, the casing part 3 remains with the cable spool 17 and the shifting cable 16 on the driving wheel and the connecting sleeve 6 and the pull cable 13 remain on the bicycle frame.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

What is claimed is:

1. A detachable coupling for connecting a pull cable connected to a shift actuator to a shifting cable connected to an internal gear hub for transmitting a shifting movement of the shift actuator to the internal gear hub along a cable transmission path, said detachable coupling comprising:
    an internal gear hub casing having a cable guide extending therefrom;
    a connecting sleeve configured to be removably attached to the cable guide; and
    a pull cable nipple configured to be removably attached to a shifting cable nipple, one end of the shifting cable attached to the shifting cable nipple associated with the cable guide, one end of the pull cable attached to the pull cable nipple associated with the connecting sleeve, when the connecting sleeve is removably attached to the cable guide, the pull cable nipple is simultaneously removably attached to the shifting cable nipple.

2. The detachable coupling according to claim 1, wherein the shifting cable is biased against a stopping face in the cable guide.

3. The detachable coupling according to claim 1, wherein the cable guide and the connecting sleeve, when coupled, are rigidly connected in an axial direction but allows movement in a lateral direction to permit angular movement of the connecting sleeve relative to the internal gear hub casing.

4. The detachable coupling according to claim 3, wherein the connection of the cable guide to the connecting sleeve is configured to permit lateral motion of the connecting sleeve without substantially changing the axial length of the cable transmission path.

5. The detachable coupling according to claim 1, wherein the shifting cable nipple includes first and second radially extending contours, the first radially extending contour being received in a cavity of the cable guide such that the second radially extending contour protrudes beyond an end of the cable guide to be received in a contoured groove of the pull cable nipple.

6. The detachable coupling according to claim 1, wherein the cable guide and the casing have an adjusting element for adjusting the length of the cable transmission path, the casing having a window for viewing a casing marking and a cable spool marking.

7. The detachable coupling according to claim 1, wherein the connection between the cable guide and the connecting sleeve is configured such that the length of the cable transmission path remains substantially constant after disengagement and reengagement of the detachable coupling.

8. The detachable coupling according to claim 7, wherein after the detachable coupling is disengaged, the end of the shifting cable is biased by a pretensioned cable spool against a stopping face in the cable guide.

9. The detachable coupling according to claim 7, wherein after the detachable coupling is disengaged, the end of the pull cable is biased by a spring element against a stopping face in the connecting sleeve.

10. The detachable coupling according to claim 1, wherein the connection between the cable guide and the connecting sleeve is a bayonet connection.

11. The detachable coupling according to claim 1, wherein the connecting sleeve includes a contour slot configured to be removably attached to the cable guide.

12. The detachable coupling according to claim 11, further comprising a sliding sleeve configured to slide along an outer surface of the connecting sleeve to cover the contoured slot of the connecting sleeve.

13. The detachable coupling according to claim 12, wherein the sliding sleeve is locked on the connecting sleeve when positioned to cover the contoured slot of the connecting sleeve.

14. The detachable coupling according to claim 12, wherein the sliding sleeve is biased to cover the contoured slot of the connecting sleeve.

15. The detachable coupling according to claim 11, wherein the cable guide includes a protruding contour configured to engage the contoured slot of the connecting sleeve to form an axially rigid connection.

16. The detachable coupling according to claim 11, wherein the contoured slot is configured to radially receive the cable guide and the shifting cable.

17. A detachable coupling for connecting a pull cable connected to a shift actuator to a shifting cable connected to an internal gear hub for transmitting a shifting movement of the shift actuator to the internal gear hub along a cable transmission path, said detachable coupling comprising:
    an internal gear hub casing having a cable guide extending therefrom;
    a connecting sleeve configured to be removably attached to the cable guide; and
    a pull cable nipple configured to be removably attached to a shifting cable nipple, one end of the shifting cable attached to the shifting cable nipple associated with the cable guide, one end of the pull cable attached to the pull cable nipple associated with the connecting sleeve, when the connecting sleeve is removably attached to the cable guide, the pull cable nipple is simultaneously removably attached to the shifting cable nipple, wherein the connecting sleeve includes a contour slot configured to be removably attached to the cable guide, the connecting sleeve having first and second ends and a contour slot configured to be removably attached to the cable guide, the first end having the contoured slot for receiving the cable guide, the second end having a thread for receiving an adjusting element for adjusting the length of the cable transmission path.

18. A detachable coupling for connecting a pull cable connected to a shift actuator to a shifting cable connected to an internal gear hub for transmitting a shifting movement of the shift actuator to the internal gear hub along a cable transmission path, said detachable coupling comprising:

an internal gear hub casing having a cable guide extending therefrom;
a connecting sleeve configured to be removably attached to the cable guide; and
a pull cable nipple configured to be removably attached to a shifting cable nipple, one end of the shifting cable attached to the shifting cable nipple associated with the cable guide, one end of the pull cable attached to the pull cable nipple associated with the connecting sleeve, when the connecting sleeve is removably attached to the cable guide, the pull cable nipple is simultaneously removably attached to the shifting cable nipple, wherein the pull cable nipple is biased against a stopping face in the connecting sleeve, the pull cable nipple including a contoured groove for receiving the shifting cable nipple, the connecting sleeve having an inner contour having a non-circular shape for preventing the pull cable nipple from twisting inside the connecting sleeve.

19. The detachable coupling according to claim 18 wherein the pull cable nipple is biased against the stopping face by a spring element supported by one of the connecting sleeve and an adjusting element located at one end of the connecting sleeve for adjusting the length of the cable transmission path.

20. The detachable coupling according to claim 19, wherein the connecting sleeve further includes a window for viewing the position of the pull cable along the connecting sleeve.

* * * * *